(12) United States Patent
Lee et al.

(10) Patent No.: US 6,295,105 B1
(45) Date of Patent: Sep. 25, 2001

(54) ENHANCED BACKLIGHT ASSEMBLY FOR A LIQUID CRYSTAL DISPLAY

(75) Inventors: Sang-duk Lee, Yongin; Jeong-hwan Lee; Chung-hyuk Shin, both of Suwon; Jung-ki Kim, Yongin, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/245,123

(22) Filed: Jan. 14, 1999

(30) Foreign Application Priority Data

Jan. 8, 1999 (KR) .................................................. 99-220

(51) Int. Cl.$^7$ ...................................................... G02F 1/13
(52) U.S. Cl. ................... 349/65; 362/26; 362/31
(58) Field of Search .................. 349/65; 362/26, 362/31

(56) References Cited

FOREIGN PATENT DOCUMENTS

| 05-93908 | * | 4/1993 | (JP) . |
| 6-34818 | * | 2/1994 | (JP) . |
| 10-186339 | * | 7/1998 | (JP) . |
| 11-34120 | * | 2/1999 | (JP) . |
| 11-231321 | * | 8/1999 | (JP) . |

\* cited by examiner

*Primary Examiner*—Kenneth Parker
(74) *Attorney, Agent, or Firm*—Howrey Simon Arnold & White, LLP (57) ABSTRACT

A backlight assembly for use of LCD module wherein a current leakage from a lamp cover disposed under a fluorescent lamp is prevented includes a back cover facing the lamp cover under the fluorescent lamp and which has a plurality of penetrating holes.

8 Claims, 6 Drawing Sheets

ENHANCED BACKLIGHT ASSEMBLY FOR A LIQUID CRYSTAL DISPLAY

BACKGROUND OF THE INVENTION

1. Field of the Invention

The present invention relates to a liquid crystal display module, and more particularly to a backlight assembly for use of liquid crystal display (LCD) module, which is enhanced for a better luminance.

2. Description of the Related Art

Cathode ray tubes (CRTs) are primarily used for monitors of televisions, measuring instruments, or data terminals. However, such CRTs are large and heavy, and thus inappropriate for a tendency of size and weight reductions in the electronic appliances.

Liquid crystal display (LCD) devices are a well known form of flat panel display. Especially, the smaller, lighter and less power consumptive characteristics make the LCD devices considered as one of the most leading display devices for overcoming disadvantages of CRTs.

Differently from CRTs, the liquid of an LCD device which is injected between a thin film transistor (TFT) substrate and a color filter is not a light emitting element but a light receiving one that controls the amount of the light emitted from external devices so as to display onto a screen. Therefore, an additional light source, say, backlight unit, is absolutely necessary for irradiating the light onto the LCD panel.

Accordingly, performance of the backlight unit affects significantly to the quality of LCD devices.

Such a backlight unit is composed of various optical components.

Figure 1:
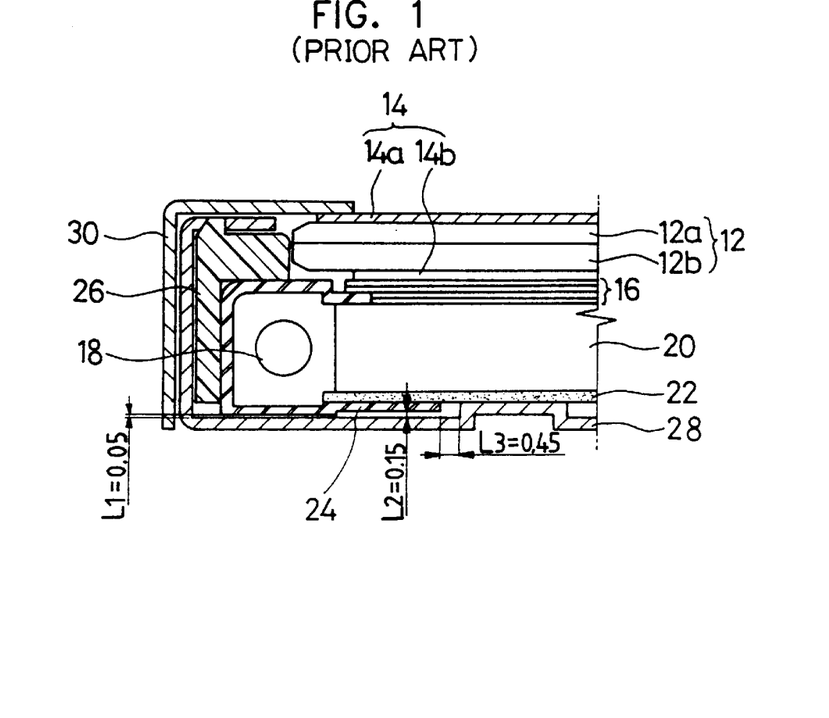
FIG. 1 is a partial section view of a conventional backlight assembly for use of LCD module.

As shown in FIG. 1, to prevent the LCD panel from being suffered from the lowered efficiency of the light, which may occur while the light is emitted to the LCD panel, the backlight unit employs a lamp cover 24 for covering the outer periphery of a fluorescent lamp 18, and a back cover 28 for supporting the lamp cover 24.

However, as shown in FIG. 1, if the lamp cover 24 and the back cover 28 contact at whole surfaces thereof, the heat which is generated when the lamp is turned on is transmitted to the back cover 28 through the lamp cover 24. Accordingly, the time period for luminance saturation is delayed by the heat loss.

As expressed in the following Equation (1), a capacitor is in proportion to the size (S), and is in inverse proportion to the distance (L).

$$C = \sigma \frac{S}{L} \quad \text{Equation (1)}$$

Wherein, C indicates the capacitance, σ indicates the dielectricity, S indicates the size of the contact area between conductors, and L indicates the distance between conductors.

However, the distant-L1 between the lamp cover 24 and the back cover 28 is just 0.05 mm, which increases size (S) of the contact area between the lamp cover 24 and the back cover 28 during assembly. As a result, the value of the capacitance (C) becomes larger, which causes an increase in current leakage and lowering of the luminance. In addition, the size of the contact area increases, thus extending the time period for luminance saturation.

When the SIC-130 inverter is used in the simulation, the estimated luminance is approximately 100 nit at the current of 5 mA, the current leakage is approximately 1.25 mA, and the time period for luminance saturation is 40 to 50 minutes.

Moreover, the luminance of the lamp of the backlight unit varies in accordance with the ambient temperature. The luminance of the lamp becomes the highest when the ambient temperature is about 40° C. to 50° C. However, the back cover is made of a metal, which emits a heat. Thus, the temperature around the lamp is dropped down and the luminance is lowered.

SUMMARY OF THE INVENTION

It is therefore an object of the present invention to prevent a luminance degradation of a backlight unit.

It is another object of the present invention to minimize the time period for stabilizing the luminance of the backlight unit.

It is still another object of the present invention to minimize the current leakage of the lamp.

According to an aspect of the present invention, there is provided a lamp assembly for use of LCD module including a back cover having a plurality of penetrating holes with a predetermined diameter. To minimize the contact area between the back cover and the lamp cover, the surface of the back cover is provided with a plurality of embossings or beadings which are formed in the direction at which the back cover contacts the lamp cover.

Selectively, each contact surface of the back cover and the lamp cover is laminated using an insulator, for example, polyethylene terephthalate (PET).

According to another aspect of the present invention, a plurality of penetrating holes for a temperature radiation are formed to the lamp cover. Selectively, a silver (Ag)-plated film is coated on the surface of the lamp cover facing the fluorescent lamp.

According to still another aspect of the present invention, the sufficient distance between the back cover and the lamp cover is maintained, and a buffer member, for example, a cushion, is inserted therebetween. If the distance between the lamp cover and the back cover is 0.4 mm, the preferable thickness of the cushion is 0.3 mm.

According to further another aspect of the present invention, the lamp assembly for use of LCD module is structured in that only a lamp cover is provided without a back cover.

BRIEF DESCRIPTION OF THE DRAWINGS

The above object and other advantages of the present invention will become more apparent by describing in detail the preferred embodiments thereof with reference to the accompanying drawings, in which.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those having skill in the art.

Figure 2:
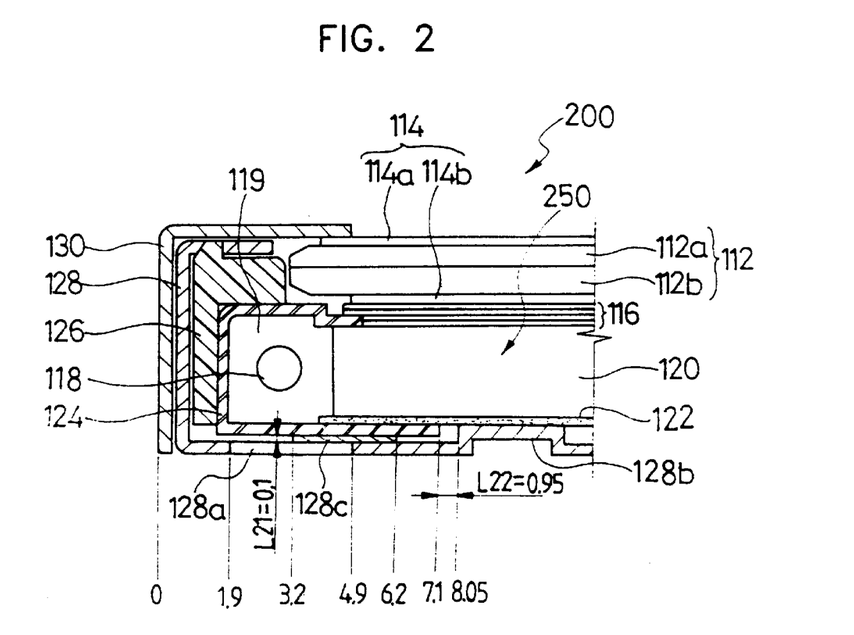
FIG. 2 is a partial section view of the backlight assembly for use of LCD module according to embodiment 1 of the present invention.

FIG. 2 is a partial section view showing a backlight assembly according to an embodiment 1 of the present invention, where the luminance degradation and the current leakage are prevented by changing the structure of a back cover.

Referring to FIG. 2, an LCD module 200 includes a backlight assembly 250 for irradiating a light to a LCD panel 112 and which is disposed under the LCD panel 112 having a color filter substrate 112a and a TFT substrate 112b.

The backlight assembly 250 includes a fluorescent lamp 118 disposed in one edge of the LCD panel 112, a lamp holder 119 for accommodating the fluorescent lamp 118, a lamp cover 124 for covering the outer periphery of the lamp holder 119 and which reflects the light emitted from the fluorescent lamp 118, a mold frame 126 for accommodating the lamp cover 124 and the LCD panel 112, a light guide plate 120 extended from the fluorescent lamp 118 perpendicularly the fluorescent lamp 118 and which guides the light emitted from the fluorescent lamp 118, a reflector plate 122 positioned under the light guide plate 120 and which reflects the light came through the guide light plate 120 toward the LCD panel 112, and a back cover 128 disposed surrounding the mold frame 126, the lamp cover 124, and the reflector plate 122.

The lamp cover 124 has one end portion thereof extended to a predetermined position of the guide light plate 120, and the reflector plate 122 has one end portion thereof inserted between the above-described extended end portion of the lamp cover 124 and the guide light plate 120.

A plurality of penetrating holes 128a and contact projections 128c are formed on the bottom surface of the back cover 128, to thereby minimize the area for contact with the lamp cover 124. In addition, a recess-shaped beading 128b which contacts the reflector plate 122 is formed to the back cover 128 in the direction parallel with the lengthwise direction of the lamp 118.

A brass or SUS430 having excellent luminance and uniformity and less current loss is employed for the lamp cover 124, and SUS304 is employed for the back cover 128. Each surface of the lamp cover 124 and the back cover 128 facing each other, that is, the bottom surface of the lamp cover 124 and the upper surface of the back cover 128 are laminated using a polyethylene terephthalate (PET, which eliminates the possibility of contact between the lamp cover 124 and the back cover 128.

The surface of the lamp cover is not laminated and is thus acute. The contact projection 128c formed on the surface of the back cover 128 prevents the lamp cover from being contact the back cover 128 during an assembly.

The distance L21 between the bottom surface of the lamp cover 124 and the back cover 128 is approximately 0.1 mm, and the contact projection 128c of the back cover 128 has a height of approximately 0.1 mm, excluding the beading 128b where the back cover 128 and the reflector plate 122 directly contact.

The distance L22 between the end portion of the bottom surface of the lamp cover 124 and the end portion of the back cover 128 where an embossing starts is required to be formed as long as possible, preferably 0.95 mm.

Referring again to FIG. 2, if the left most outer surface of a top chassis 130 accommodating the upper edge and side surface of the LCD panel 112 is set as a start point, the penetrating hole 128a diameter of which is 3 mm is formed in the portion which is spaced from the start point by 1.9 mm to 4.9 mm, and the contact projection 128c is formed in the portion which is spaced from the start point by 1.9 mm to 6.2 mm.

Figure 3:
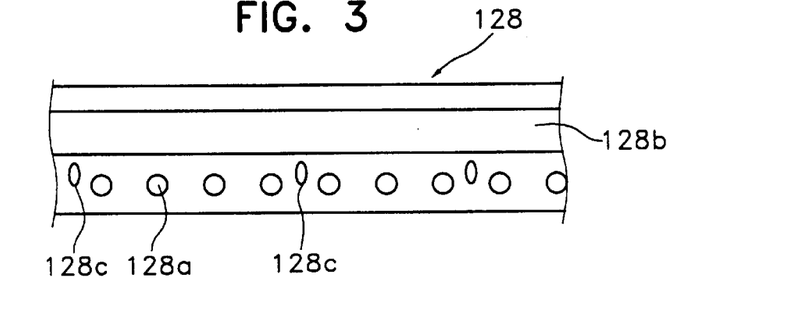
FIG. 3 is a partial plan view of the bottom surface of the lamp cover shown in FIG. 2.

FIG. 3 is a partial plan view of the bottom surface of the lamp cover shown in FIG. 2.

Now referring to FIG. 3, the penetrating hole 128a is shaped as a circle having a diameter of approximately 3 mm, and the contact projection 128c is shaped as an ellipse having a length almost same as that of the penetrating hole 128a. In the embodiment of the present invention, a pitch between penetrating hole 128a formed to the back cover 128 is approximately 7 mm.

When the backlight assembly having the above-described structure is estimated, the current leakage is decreased to 0.3 mA to 0.4 mA, the luminance is enhanced significantly to 135 nit at the current of 5 mA, and the time period for luminance saturation is decreased to 5 to 10 minutes.

In the above-described embodiment, the structure of the back cover is modified without modifying the structure of the lamp cover so as to reduce the current leakage and the time period for luminance saturation and increase the luminance. However, to obtain the above-mentioned advantages, the structure of the lamp cover can be also modified.

There are three kinds of lamp covers; one using a PET to minimize the current leakage of the lamp, another using silver (Ag) sheet for a high luminance, and the other using a silver (Ag)-coated brass plate.

The brass plate is gaining in popularity recently due to its benefits of luminance enhancement and reduced thickness.

The lamp used in the backlight assembly varies its luminance in accordance with the ambient temperature. Specifically, the ambient temperature of 40° C. to 50° C. presents the highest luminance. However, the lamp cover and the back cover are all made up of metal, which drops down the ambient temperature. As a result, the luminance is lowered.

Therefore, in another embodiment of the present invention, the lamp cover has a modified structure so as to prevent lowering of the ambient temperature.

Figure 4:
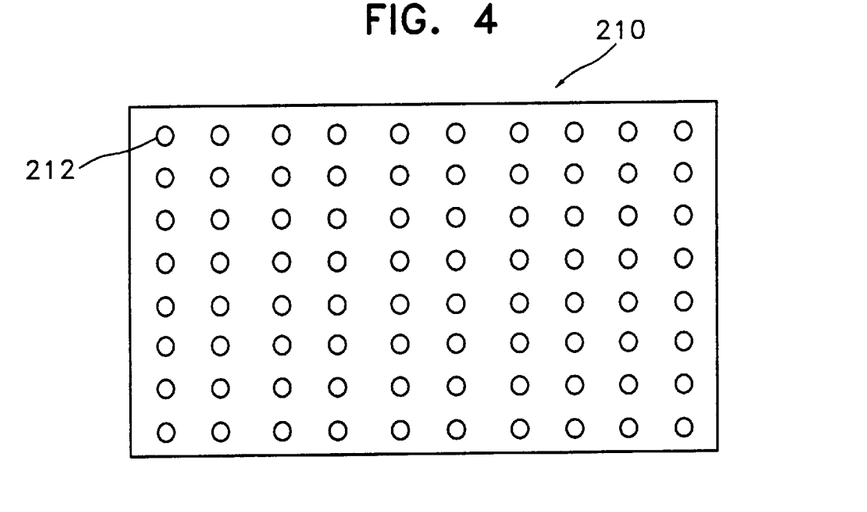
FIGS. 4 to 6 illustrate a process for manufacturing a lamp cover according to another embodiment of the lamp cover of the present invention.

Referring to FIG. 4, a brass plate 210 having a plurality of penetrating holes 212 is arranged.

Figure 5:
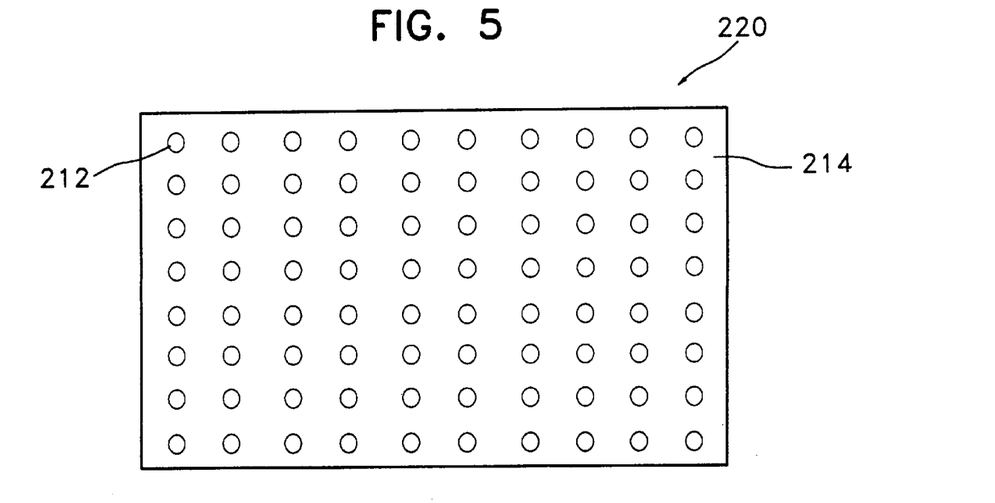
Figure 6:
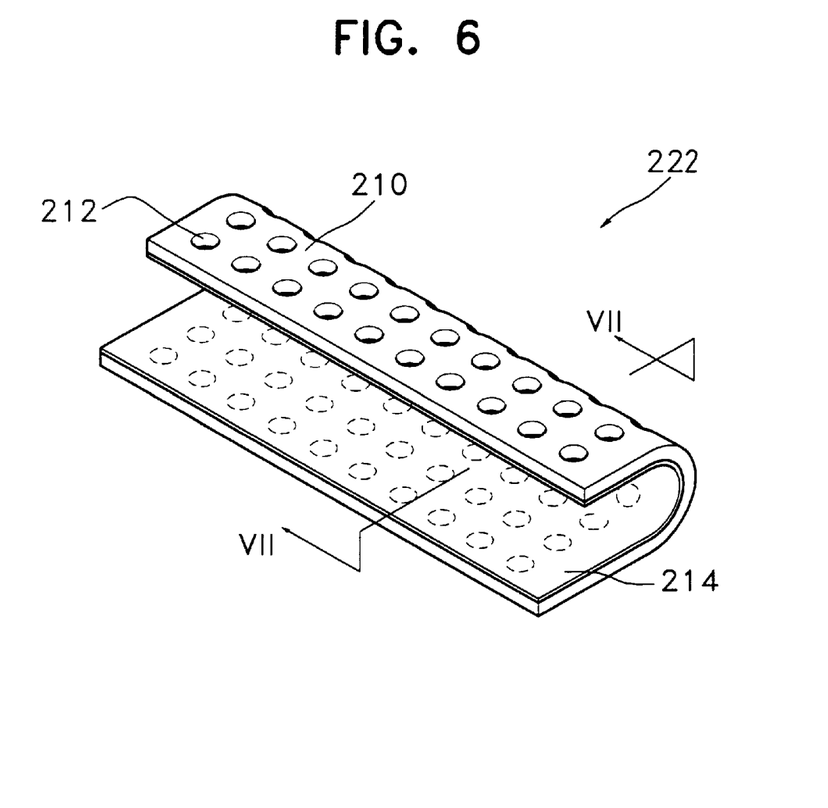

Now referring to FIG. 5, a silver (Ag) film 214 is coated onto one surface of the brass plate 210. Then, a silver-coated brass plate 220 shown in FIG. 5 is pressed so as to obtain a lamp cover 222 of the lamp assembly for use of LCD module, as shown in FIG. 6.

Figure 7:
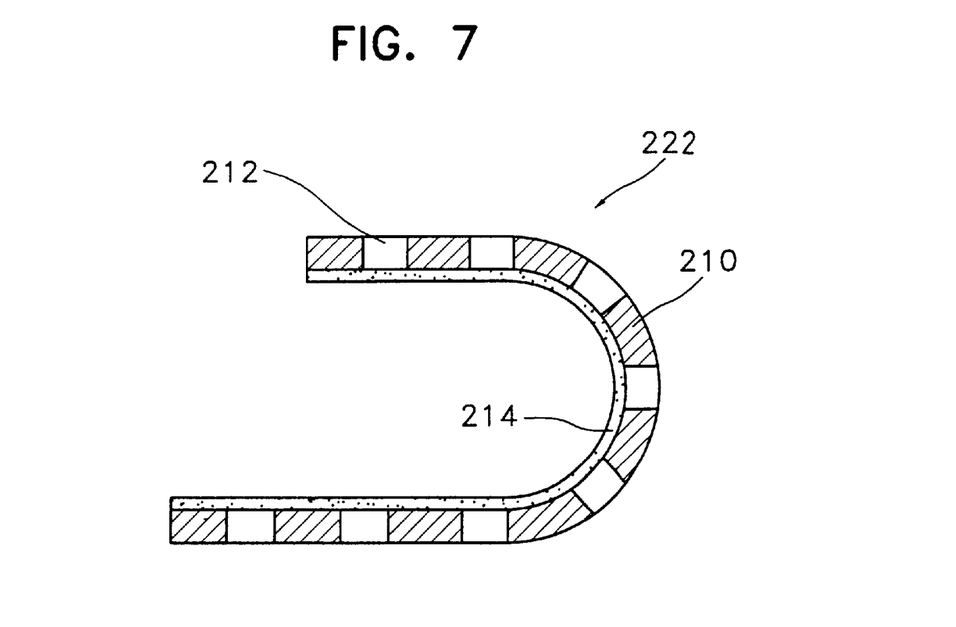
FIG. 7 is a section view of the lamp cover taken along the line VII—VII of FIG. 6.

As shown in FIG. 7, a section view of the lamp cover taken along the line VII—VII of FIG. 6, the lamp cover 222 accommodating the lamp has an inner surface covered over with silver (Ag) and an outer surface having penetrating holes 212.

The backlight assembly adapting the thus-structured lamp cover 222 has a luminance increased by 5% to 10% than the prior art.

A thermal conductivity significantly depends on the size of the contact area and the degree of the thermal transfer between two substances as expressed in the following Equation (2);

$$\frac{dQ}{dt} = -KA \times \frac{dT}{dx} \qquad (2)$$

Wherein, K indicates the degree of the thermal transfer, A indicates the size of the contact area between the two substances, Q indicates the thermal conductivity, T indicates a temperature difference between the two substances, and x indicates the thickness of the substance to which the heat is transferred.

Metals such as silver (Ag) or copper have thermal conductivity of 200 J/s 99×m×°C. or higher, while the air or the base metal has those of 1 J/s×m×°C. or lower. Therefore, the size of the contact area between the lamp cover 220 and the back cover is reduced due to the penetrating holes formed to the lamp 220 of the brass plate, which degrades the thermal conductivity.

The thermal conductivity varies at every 1° C. by 20 to 30 cd/m². Therefore, if the ambient temperature is less lowered by 5° C. than the conventional art, the luminance increase may be obtained by 100 to 150 cd/m².

In addition, the surface area is reduced due to the above-described structure, which decreases a capacitance. As a result, the current leakage decreases, too.

Figure 8:
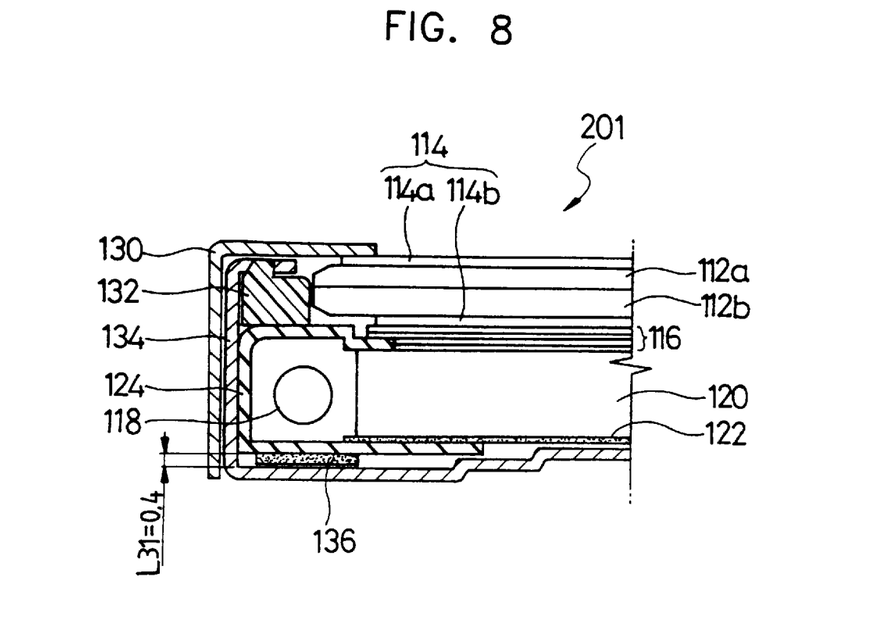
FIG. 8 is a partial section view showing a backlight assembly for use of LCD module according to embodiment 2 of the present invention.

FIG. 8 is a partial section view of the LCD module 201 having the backlight assembly of embodiment 2 of the present invention, wherein a buffer member like a cushion 136 of 0.3 mm is inserted between the lamp cover 124 and a back cover 134. Here, the distance L31 between the lamp cover 124 and the back cover 134 is approximately 0.4 mm.

The cushion 136 serves to ensure sufficient space between the lamp cover 124 and the back cover 134, which prevents possible luminance decrease which may be caused by the capacitance increase. In addition, the cushion 136 absorbs the impact transmitted to the lamp 18 and thus prevents a fluctuation.

Figure 9:
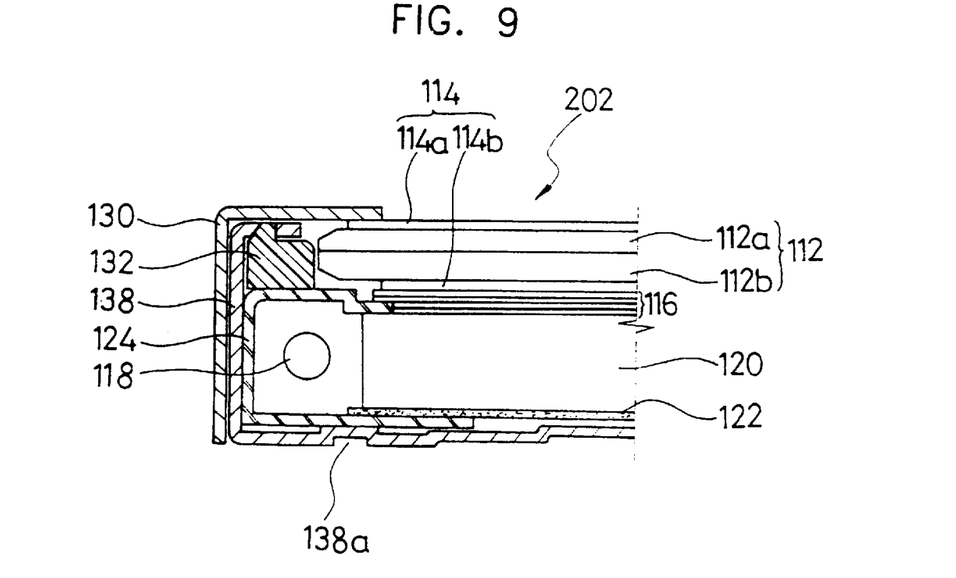
FIG. 9 is a partial section view showing a backlight assembly for use of LCD module according to embodiment 3 of the present invention.

FIG. 9 is a partial section view of the LCD module 202 having the backlight assembly according to embodiment 3 of the present invention. Here, an embossing 138a protruded toward the direction at which the back cover contacts the lamp cover is formed on the surface of the back cover 138, so as to thereby minimize the size of the contact area between the lamp cover and the back cover 138.

Although only embodiment 1 has penetrating holes, embodiments 2 and 3 may also have penetrating holes. It is also possible to form the penetrating holes shown in FIGS. 3 and 7 to both the back cover and the lamp cover.

Figure 10:
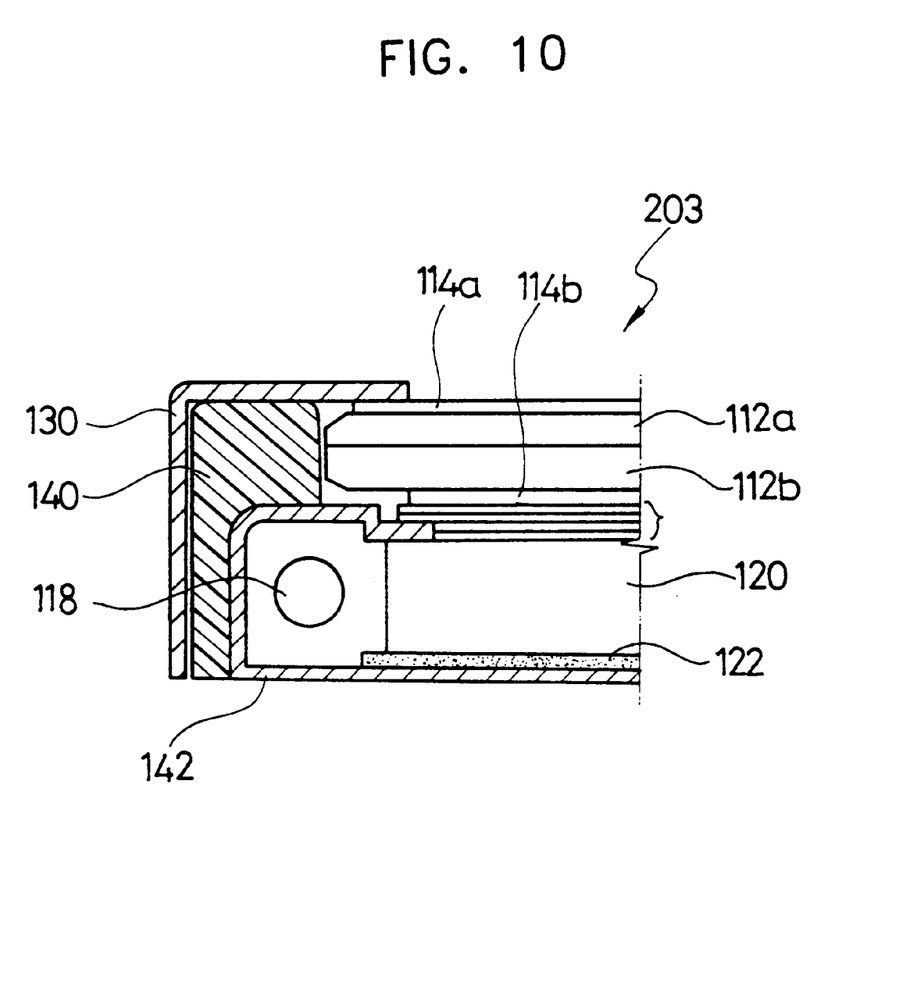
FIG. 10 is a partial section view showing a backlight assembly for use of LCD module according to embodiment 4 of the present invention.

FIG. 10 is a partial section view showing the lamp assembly according to embodiment 4 of the present invention, where the back cover is removed, differently from embodiments 1 to 3.

The structure shown in FIG. 10 is weak in structure, however, is advantageous in obtaining a high luminance of the present invention.

Figure 11:
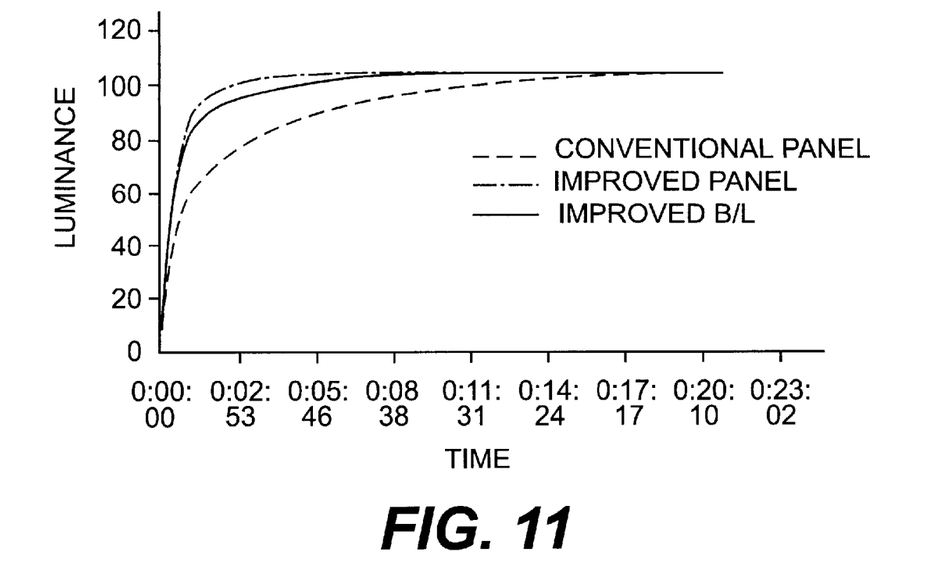
FIG. 11 is a graphical representation showing the luminance changes in backlight assemblys of the conventional art and the present invention.

FIG. 11 is a graphical representation showing the luminance changes in backlight assemblys of the conventional art and the present invention. Here, the dotted line indicates the value estimated using the LCD panel that employs the conventional backlight assembly where the back cover has no penetrating hole and the outer surface of the lamp cover made up of a brass is not insulation-coated. The one-dot chain line and the solid line indicates the value estimated using the LCD panel that employs the backlight assembly of the present invention where the outer surface of the lamp cover made of SUS is insulation-coated and the metal mold is employed as a back cover. The one-dot chain line indicates the value estimated in the LCD module while the solid line indicates those estimated in a backlight unit.

Referring to FIG. 11, in the backlight assembly of the present invention, the luminance is saturated within 5 to 10 minutes, while the luminance in the conventional backlight assembly is saturated after 20 minutes elapse. From FIG. 11, it is learned that laminating an insulator onto the surface of the back cover can substantially reduce the time period for luminance saturation.

Figure 12:
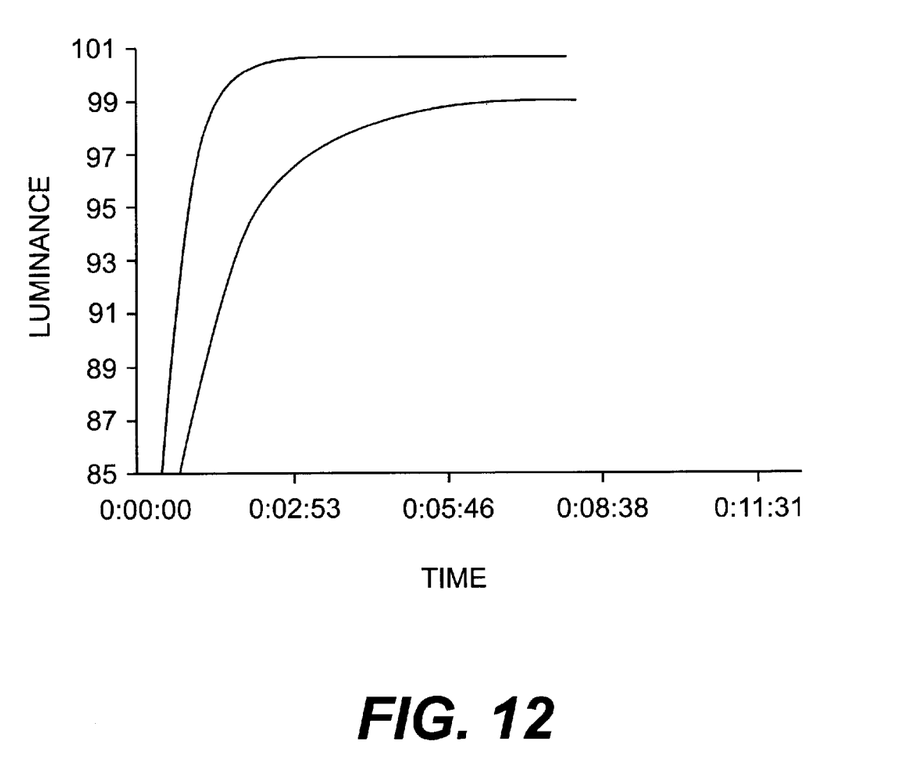
FIG. 12 is a graphical representation showing the luminance change in the backlight assembly according to the present invention.

FIG. 12 is a graphical representation showing the luminance change in the backlight assembly according to the present invention. The condition of the simulation shown in FIG. 12 is that whether a brass or an SUS is employed as a material for the lamp cover, whether the top chassis and the back cover is floated or grounded, whether the back cover is laminated using polyethylene terephthalate (PET), and whether the back cover is removed or not.

Referring to FIG. 12, the time period for luminance saturation varies according to the condition whether the back cover is provided or not, rather than the other conditions. That is, the case "A" where the back cover is removed has shorter time period for luminance saturation than that of the case "B" where the back cover is not removed.

In the backlight assembly of the present invention, penetrating holes are formed to either the back cover or the lamp cover so as to reduce the contact area between the back cover and the lamp cover, thereby preventing the current leakage and the luminance degradation. In addition, the penetrating holes weaken the heat emitting function of such cover, thus prevents lowering of the ambient temperature and luminance. The lamp cover and the back cover are prevented from being contact with each other in such a manner that each facing surface of the lamp cover and the back cover is laminated using polyethylene terephthalate (PET), the sufficient space between the two covers are ensured and a cushion is inserted therebetween, or a contact projection is formed on the surface of the back cover. As a result, the time period of luminance saturation is reduced.

Moreover, the backlight assembly is constituted only by the lamp cover, without using the back cover, to thereby substantially enhance a luminance.

This invention has been described above with reference to the aforementioned embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A backlight assembly for use of an LCD module having a fluorescent lamp disposed along one edge of said LCD module, a lamp cover for covering an outer periphery surface of said fluorescent lamp and which reflects a light emitted from said fluorescent lamp, a mold frame for accommodating an outer edges of said lamp cover and said LCD panel, a light guide plate extended perpendicularly to a lengthwise direction of said fluorescent lamp and which guides said light emitted from said fluorescent lamp, a reflector plate positioned under said light guide plate and which reflects a light came through said light guide plate, and a back cover disposed in an outer wall of said mold frame and under said lamp cover and said reflector plate,     wherein a plurality of penetrating holes are formed to said back cover facing said lamp cover disposed under said fluorescent lamp.

2. The backlight assembly according to claim 1, wherein said penetrating holes are formed in regular intervals in said lengthwise direction of said fluorescent lamp, and further comprising between said penetrating holes a plurality of contact projections contacting said lamp cover disposed under said fluorescent lamp.

3. The backlight assembly according to claim 2, wherein said penetrating holes are formed in one line along said lengthwise direction of said fluorescent lamp.

4. The backlight assembly according to claim 1, wherein each surface of said back cover and said lamp cover further comprise an insulation film formed onto said each surface.

5. The backlight assembly according to claim 1, further comprising a recess-shaped beading that contacts said reflector plate and is formed along said lengthwise direction of said fluorescent lamp, and a predetermined space between an end portion of said beading and an end portion of said lamp cover is maintained.

6. A backlight assembly for use of an LCD module having a fluorescent lamp disposed along one edge of said LCD module, a lamp cover for covering an outer periphery surface of said fluorescent lamp and which reflects a light emitted from said fluorescent lamp, a mold frame for accommodating an outer edges of said lamp cover and said LCD panel, a light guide plate extended perpendicularly to a lengthwise direction of said fluorescent lamp and which guides said light emitted from said fluorescent lamp, a reflector plate positioned under said light guide plate and which reflects a light came through said light guide plate, and a back cover disposed in an outer wall of said mold frame and under said lamp cover and said reflector plate,     wherein a plurality of penetrating holes are formed to said lamp cover.

7. The backlight assembly according to claim 6, wherein said lamp cover further comprises a silver-plated film coated onto a surface thereof facing said lamp.

8. A backlight assembly for use in an LCD module having a fluorescent lamp disposed along one edge of said LCD module, a lamp cover for covering an outer periphery surface of said fluorescent lamp and which reflects a light emitted from said fluorescent lamp, a mold frame for accommodating an outer edges of said lamp cover and said LCD panel, a light guide plate extended perpendicularly to a lengthwise direction of said fluorescent lamp and which guides said light emitted from said fluorescent lamp, and a reflector plate positioned under said light guide plate and which reflects a light came through said light guide plate,     wherein a bottom surface of said lamp cover forms a portion of a lower surface of said backlight assembly.

\* \* \* \* \*